United States Patent [19]

Hirauchi et al.

[11] Patent Number: 4,912,556
[45] Date of Patent: Mar. 27, 1990

[54] APPARATUS FOR COMPENSATING CONTOUR OF TELEVISION SIGNAL

[75] Inventors: Yoshio Hirauchi, Osaka; Yuichi Ninomiya; Yoshimichi Ohtsuka, both of Kawasaki; Yoshinori Izumi, Tokyo, all of Japan

[73] Assignees: Matsushita Electric Industrial Co., Ltd., Osaka; Nippon Hoso Kyokai, Tokyo, both of Japan

[21] Appl. No.: 314,182

[22] Filed: Feb. 23, 1989

[51] Int. Cl.$^4$ .................... H04N 5/208; H04N 7/00
[52] U.S. Cl. ............................. 358/162; 358/12; 358/37; 358/96; 358/166; 358/138
[58] Field of Search ............... 358/12, 37, 96, 105, 358/162, 166, 133, 140, 135, 138

[56] References Cited

U.S. PATENT DOCUMENTS

| | | | |
|---|---|---|---|
| 4,090,221 | 5/1978 | Connor | 358/166 |
| 4,551,753 | 11/1985 | Nishizawa et al. | 358/133 |
| 4,706,113 | 11/1987 | Ito et al. | 358/166 |
| 4,716,462 | 12/1987 | Wargo et al. | 358/37 |
| 4,745,458 | 5/1988 | Hirano et al. | 358/12 |
| 4,745,459 | 5/1988 | Ninomiya et al. | 358/12 |

OTHER PUBLICATIONS

"HD-TV Broadcasting System Using Single Channel Satellite (MUSE)", Television Society Technical Report, TEBS 95-2, Nippon Hoso Kyokai.

Primary Examiner—John W. Shepperd
Assistant Examiner—Michael D. Parker
Attorney, Agent, or Firm—Stevens, Davis, Miller & Mosher

[57] ABSTRACT

There is provided an apparatus for compensating a contour of a television signal in a TV signal processing apparatus in which a predetermined control signal including a field interpolation control signal to control an interpolating method when reconstructing by an interpolation an image signal which was band compressed by the sub-Nyquist sampling is time sharingly multiplexed for a blanking period, wherein a signal of a still area processed by a still image system processing circuit and a signal of an animation area processed by an animation image system processing circuit are mixed by a mixing circuit every pixel, when the mixed signal is used as an input signal to the subsequent circuits, the OR of the binary signal of the movement amount and the field interpolation control signal transmitted from the transmission side is calculated, the still and animation areas are distinguished by the OR signal, and a contour is emphasized by a two-dimensional contour compensating circuit for the signal in the animation area.

1 Claim, 4 Drawing Sheets

- ● 4n TH FIELD
- ■ (4n+1)TH FIELD
- ○ (4n+2)TH FIELD
- □ (4n+3)TH FIELD
- × SAMPLING POINTS WHICH ARE NOT TRANSMITTED n: INTEGER
h: INTERVAL BETWEEN SCANNING LINES
d: SAMPLING INTERVAL

APPARATUS FOR COMPENSATING CONTOUR OF TELEVISION SIGNAL

BACKGROUND OF THE INVENTION

1. Field of the Invention

The present invention relates to an apparatus for receiving a television signal which was subjected to a band compressing process and, more particularly, to an apparatus for receiving a television signal in which a signal band width is reduced by the sub-Nyquist sampling between frames and an interpolation control signal between fields to control whether the offset sub sampling interpolating process between fields is executed or not is transmitted together with an image signal.

2. Description of the Related Art

A system for reducing a signal band width by the sub-Nyquist sampling when transmitting a wide band image signal such as a high definition television signal has been proposed by "HD-TV Broadcasting System Using Single Channel Satellite (MUSE: Multiple Sub-Nyquist Sampling Encoding)", Television Society Technical Report, TEBS 95-2, from Nippon Hoso Kyokai (Japan Broadcasting Corporation). Such a system is called a movement correcting type multiplex sub-Nyquist sampling transmission system. In detail, offsets are added to the sampling phases between fields and between frames and processes are executed such that the sampling phases are returned to the original phases by four fields, thereby transmitting an image signal. On the reception side, a frame memory is provided and the transmitted image signal is stored into the frame memory, the signals of four fields which are successively transmitted are synthesized to reconstruct one television image as a fundamental method. However, in the television for performing the interlace scanning of 2:1, the offset sub-sampling process between frames and the reconstructing process of the signal are the fundamental processes in the signal processes for every field. In a receiver of such a system, the interpolating processes between frames and between fields are executed for the image signals which were sub-sampled and transmitted, thereby reproducing an image. However, with respect to the portion accompanied with the motion in the screen, when such an interpolating method using past sampling points also is used, multilines become dim or a sampling pattern becomes a dotted pattern and appears on the display screen. Therefore, it is necessary to reproduce an image by using only the sampling points of the present field. Since the interpolating methods of an image to the still area and animation area differ, the interpolating methods are switched by using a control signal which is transmitted from the transmission side together with an image signal. The control signal is called a field interpolation control signal and is a binary signal of one bit which is output as a control signal to indicate whether the field interpolating process is executed or not for the field from the transmission side.

A conventional example regarding the present invention will now be described hereinbelow with reference to the drawings. FIG. 2 shows an example of a part of a conventional receiving apparatus of a television signal which was subjected to a band compressing process. An analog image signal is transmitted from the transmission side and converted into a digital video signal by an A/D converter. The digital video signal is supplied to a signal input terminal 1. The input digital video signal is supplied to both of an animation image system processing circuit 2 to perform a signal process of an animation area of an image and a still image system processing circuit 3 to perform a signal process of a still area, respectively. The signal which was delayed by a time of one or two frames by using delay means such as a frame memory or the like and a signal of the current frame are input to a movement amount detecting circuit 4. The difference between the two input signals is calculated by the movement amount detecting circuit 4, so that a movement amount is obtained. The difference signal is used as a control signal and output signals of the processing circuits 2 and 3 are mixed on a pixel unit basis at a ratio corresponding to the movement amount by a mixing circuit 5. The signal mixed by the mixing circuit 5 through the still and animation image system processing circuits is now the signal which was subjected to only an interpolating process between frames. Therefore, the mixed signal is then subjected to an interpolating process between fields by a field interpolating circuit 8. In the field interpolating circuit 8, the interpolating methods for the still area and animation area are different. For the still area, what is called the interpolation between fields is executed by using sampling points of two adjacent lines before one field which were time delayed by using field memories or the like and a sample point of the current line. For the animation area, since a movement exists between fields, the sample point before one field cannot be used. Therefore, what is called the in-field interpolation is executed by using only the sampling point of the current field. The interpolated signal is supplied to a signal output terminal 11. The switching control between the process for the still area and the process for the animation area is executed by using the OR of an output signal of a binarizing circuit 6 which receives an output signal of the movement amount detecting circuit 4 and a field interpolation control signal which is transmitted from the transmission side and supplied to a signal input terminal 7. The receiving apparatus of the television signal which was subjected to a band compressing process as mentioned as the conventional example uses a technique such that the image signal which was band compressed by using the 4:1 sampling method having a sampling pattern as shown in FIG. 3 is reconstructed by using the in-field interpolation, interpolation between frames, and interpolation between fields. To reconstruct the still area of an image, the interpolating process is executed by using the sampling points of four fields. A transmittable spatial frequency area as shown in FIG. 4A is provided. To reconstruct the animation area, since a movement exists between fields, the interpolation is executed by using only the sampling points of the field which are always transmitted. A transmittable spatial frequency area as shown in FIG. 4B is provided. It will be understood from the diagram that with respect to the still area, the resolution in the oblique direction slightly deteriorates as compared with the case where the square lattice-shaped sampling was executed. However, a degree of deterioration is not so large and no problem will occur when considering the reduction of the visual acuity of human being in the oblique direction. On the other hand, with regard to the animation area, the interpolation is executed by using only the sampling points of the current field, so that the spatial frequency area is fairly narrower than that of the still area and the 2:1 interlacing process is executed. Therefore, the resolutions in the vertical, horizontal, and oblique directions deteriorate to ½ of the resolutions of the still area, respectively. Thus, there is a problem such that there occurs a case where the user feels unnaturality of the picture quality due to the difference between the resolutions in the still and animation areas.

SUMMARY OF THE INVENTION

It is an object of the present invention to provide an apparatus for compensating a contour of a television signal in which a degree of deterioration in picture quality is reduced by two-dimensionally emphasizing a contour for an animation area in which only the in-field interpolation can be executed as means for suppressing the deterioration of the synthetic picture quality by making the picture quality in the animation portion sharp in order to prevent the deterioration in resolution in the animation area for the resolution in the still area.

According to the present invention, there is provided an apparatus for compensating a contour of a television signal in an apparatus for processing a television signal in which a predetermined control signal including at least a field interpolation control signal to control an interpolating method when reconstructing by the interpolation an image signal which was band compressed by executing a sub-Nyquist sampling is time sharingly multiplexed in a blanking period, wherein the contour compensating apparatus comprises: an animation image system processing circuit to process an animation area of an input image signal; a still image system processing circuit to process a still area; a mixing circuit to mix output signals of both of the processing circuits; a movement amount detecting circuit to generate a movement amount signal to change a mixture ratio in the mixing circuit in accordance with a movement; and a binarizing circuit for receiving a movement amount signal as an output of the movement amount detecting circuit and binarizing. The contour compensating apparatus further comprises: a two-dimensional contour compensating circuit for receiving an output of the mixing circuit as an input signal and for two-dimensionally emphasizing a contour of an image; and a switch for selecting either one of an output signal of the mixing circuit and an output signal of the two-dimensional contour compensating circuit on the basis of the OR of an output signal of the binarizing circuit and the field interpolation control signal which is transmitted by being multiplexed to the image signal from the transmission side By the foregoing construction, according to the invention, the signal in the still area which was processed by the still image system processing circuit and the signal in the animation area which was processed by the animation image system processing circuit are mixed by the mixing circuit every pixel and the mixed signal is used as an input signal to the subsequent circuits. Then, the OR of the signal obtained by binarizing the movement amount and the field interpolation control signal which is transmitted from the transmission side is calculated. The still and animation areas are distinguished by the OR signal. For the signal in the animation area, by emphasizing the contour by the two-dimensional contour compensating circuit, the sharpness in the animation area in which the resolution was deteriorated is raised and the picture quality in the animation area is synthetically improved to a value near the picture quality in the still area. Thus, the deterioration in picture quality in the animation area for that in the still area can be reduced.

DESCRIPTION OF THE PREFERRED EMBODIMENTS

Figure 1:
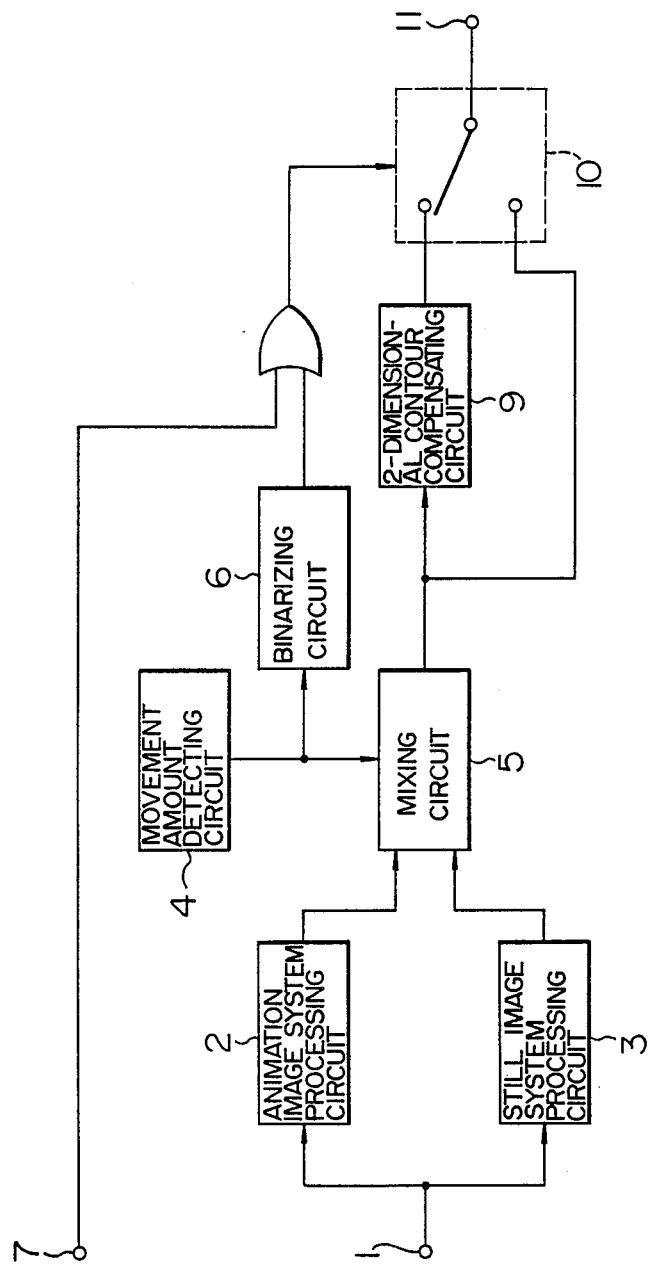
FIG. 1 is a block diagram of an apparatus for compensating a contour of a band compressed television signal in an embodiment of the present invention.
Figure 2:
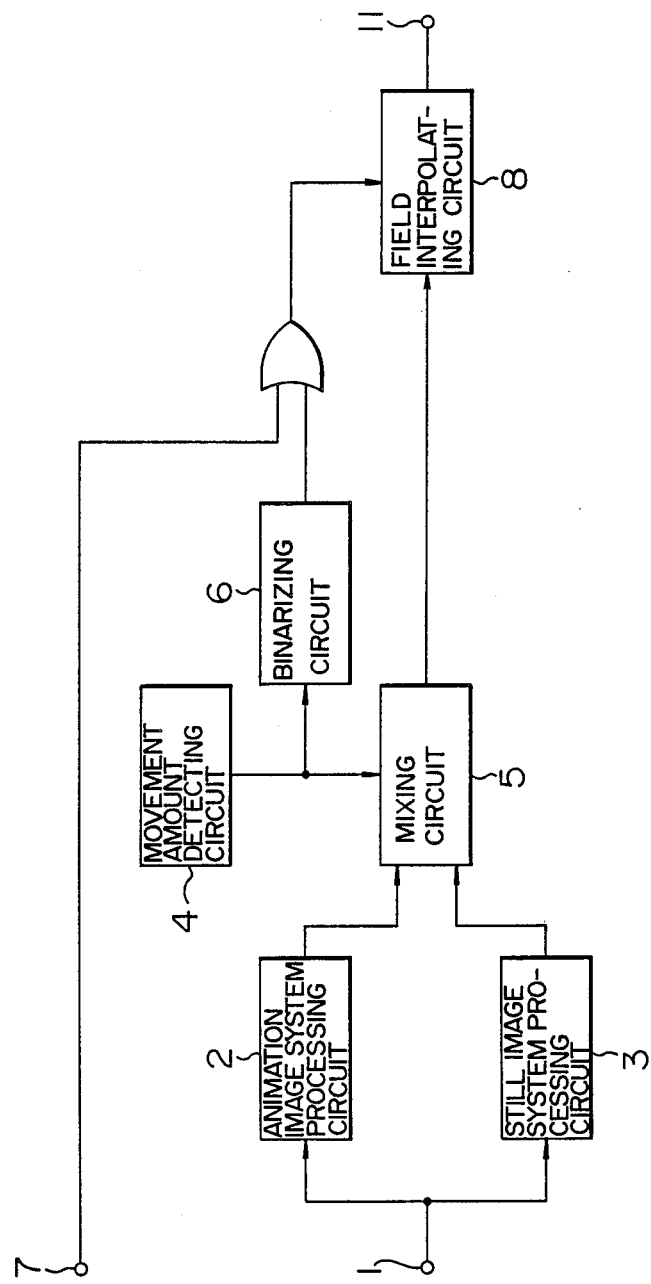
FIG. 2 is a block diagram of an apparatus for receiving a band compressed television signal in a conventional example.
Figure 3:
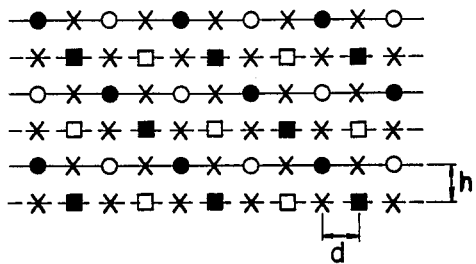
FIG. 3 is a sampling pattern diagram of an image signal which is transmitted to the television signal receiving apparatus in the conventional example.
Figure 4A:
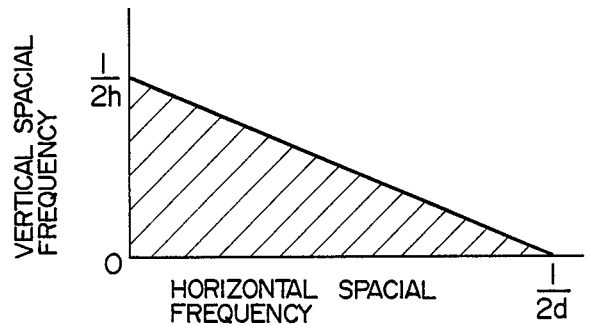
FIG. 4A is a characteristic diagram showing a transmittable spatial frequency area to a still area on a display screen.
Figure 4B:
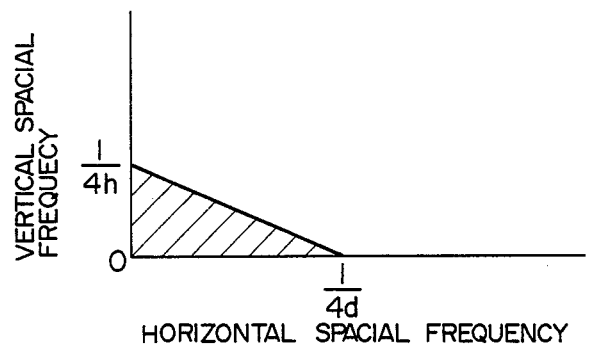
FIG. 4B is a characteristic diagram showing a transmittable spatial frequency area for an animation area on a display screen.

An embodiment of the present invention will be described hereinbelow with reference to the drawings. FIG. 1 shows an embodiment of an apparatus for compensating a contour of a band compressed television signal according to the invention. In FIG. 1, the same parts and components as those shown in FIG. 2 are designated by the same reference numerals and described.

Figure 5:
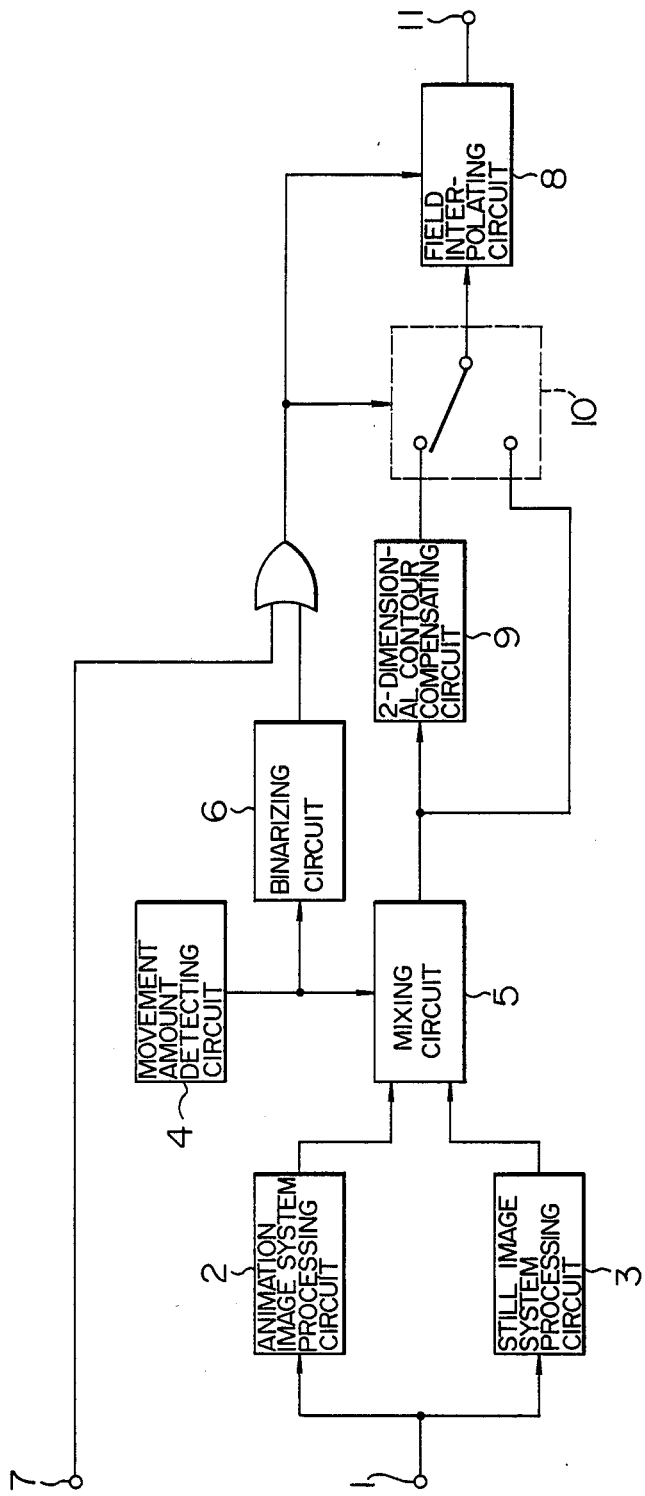
FIG. 5 is a block diagram of an apparatus for compensating a contour of a television signal according to another embodiment of the invention.

An analog image signal transmitted from the transmission side is converted into the digital image signal by using an A/D converter. The digital image signal is supplied to the signal input terminal 1. The input digital signal is then supplied to both of the animation image system processing circuit 2 to perform a signal process of the animation area of an image and the still image system processing circuit 3 to execute a signal process of the still area, respectively. A signal which was delayed by a time of one or two frames by using delay means such as a frame memory or the like and the signal of the current frame are input to the movement amount detecting circuit 4. The detecting circuit 4 calculates the difference between the two input signals, thereby obtaining a movement amount. The output signals of the processing circuits 2 and 3 are mixed on a pixel unit basis at a ratio in accordance with the movement amount by the mixing circuit 5 by using the movement amount signal as a control signal. Since the signal mixed by the mixing circuit through the processes for the still and animation images is now the signal which was subjected to only the interpolation between frames, the field interpolation must be executed at the post stage. The output signal of the mixing circuit 5 is input to a two-dimensional contour compensating circuit 9, by which an edge is two-dimensionally emphasized. Practically speaking, the two-dimensional contour compensating circuit 9 can be realized by a method whereby, for instance, an image signal of the current field is transmitted through a two-dimensional low pass filter and the resultant signal is subtracted from the original signal. It is obvious that various methods are considered in dependence on a degree of emphasis. The output of the movement amount detecting circuit 4 indicates a movement amount of a moving object when an animation area exists on a display screen. The movement amount is binarized by the binarizing circuit 6 on the basis of a predetermined threshold value. In the invention, a signal "0" of one bit is assigned to a state in which no movement exists. A signal "1" of one bit is assigned to a state in which even a small movement exists. The field interpolation control signal which is supplied from the input terminal 7 is the signal which is supplied from the transmission side and controls whether the interpolation using the image signal of the one-preceding field of the relevant field, namely, what is called the interpolating process between fields is executed or not in the signal process on the reception side. The 1-bit signal "0" is assigned when the interpolation between fields can be performed. The 1-bit signal "1" is assigned when the interpolation between fields is inhibited and only the interpolation using only the signal of the relevant field, what is called the in-field interpolation can be executed. In FIG. 1, a block to execute the field interpolating process is not shown. However, as shown in FIG. 5, the field interpolating process can be actually performed just after or before the two-dimensional contour compensating process because no change occurs in the output signal of the field interpolating process. In addition, since the field interpolating process is the same as that in the conventional example, its description is omitted. The outputs of the compensating circuit 9 and mixing circuit 5 are supplied to an input terminal of a switch 10. The OR of the output signal of the binarizing circuit 6 and the transmitted field interpolation control signal is calculated. When the OR output is set to "1", that is, when the interpolation between fields is inhibited, the switch 10 operates so as to select the output of the contour compensating circuit 9 to thereby improve the sharpness of the image. When the OR output is set to "0", namely, when the interpolation between fields is executed, this means that the perfect still image is transmitted, so that the highest resolution which can be provided by the receiving apparatus is obtained. Therefore, there is no need to compensate the contour and the switch 10 operates so as to select the output of the mixing circuit 5. The selected output is led to the signal output terminal 11.

The contour compensating circuit 9 can operate without a change in output signal irrespective of its arranging position after the branching point of the still and animation areas in the receiving apparatus. However, when the contour compensating circuit 9 is arranged before the mixing circuit 5, a contour compensating circuit which is controlled by the field interpolation control signal needs to be independently provided on the still image system processing side and a contour compensating circuit which is controlled by the binarization signal obtained by binarizing the movement amount also needs to be independently provided on the animation image system processing side, respectively. Since each circuit scale is equal to that of the contour compensating circuit in the present invention, the whole circuit scale increases. Therefore, it is more effective by arranging the contour compensating circuit after the mixing circuit 5 as in the present invention.

As will be obvious from the above description, according to the invention, in order to suppress the deterioration in the synthetic picture quality of the animation area due to the cause of the deterioration in resolution or the like for the picture quality of the still area in the image signal, the contour in the animation area is two-dimensionally emphasized by the contour compensating circuit which is controlled by both of the binary signal of the movement amount and the field interpolation control signal, thereby raising the sharpness in the animation area. Thus, the synthetic picture quality of the whole display screen can be improved and its practical effect is large.

We claim:

1. An apparatus for compensating a contour of a television signal in an apparatus for processing a television signal in which a predetermined control signal including at least a field interpolation control signal to control an interpolating method when reconstructing by an interpolation an image signal which was band compressed by executing a sub-Nyquist sampling is time sharingly multiplexed for a blanking period, said compensating apparatus comprising:

an animation image system processing circuit to process an animation area of an input image signal;

a still image system processing circuit to process a still area;

a mixing circuit to mix output signals of both of said processing circuits;

a movement amount detecting circuit to generate a movement amount signal to change a mixture ratio in said mixing circuit in accordance with a movement;

a binarizing circuit for receiving the movement amount signal as an output of said movement amount detecting circuit and binarizing;

a two-dimensional contour compensating circuit for receiving an output of the mixing circuit as an input signal and for two-dimensionally emphasizing a contour of an image; and a switch for selecting either one of the output signal of the mixing circuit and an output signal of said two-dimensional contour compensating circuit on the basis of an OR of an output signal of said binarizing circuit and the field interpolation control signal which is transmitted by being multiplexed to the image signal from the transmission side.

* * * * *